United States Patent [19]

Cowdin

[11] 4,387,513

[45] Jun. 14, 1983

[54] AIRCRAFT BODY-AXIS ROTATION MEASUREMENT SYSTEM

[75] Inventor: Kenneth T. Cowdin, Lancaster, Calif.

[73] Assignee: The United States of America as represented by the Administrator of the National Aeronautics and Space Administration, Washington, D.C.

[21] Appl. No.: 242,790

[22] Filed: Mar. 11, 1981

[51] Int. Cl.³ .............................................. G01C 19/44
[52] U.S. Cl. ..................................... 33/322; 74/5.34
[58] Field of Search ............... 33/321, 322; 74/5.6 R, 74/5.6 DE, 5.8, 5.9, 5.34; 340/870.07

[56] References Cited

U.S. PATENT DOCUMENTS

| | | | |
|---|---|---|---|
| 2,941,306 | 6/1960 | Uecker | 33/322 |
| 2,977,806 | 4/1961 | Lane | 74/5.34 |
| 3,045,356 | 7/1962 | Uecker | 33/322 |
| 3,069,912 | 12/1962 | Faux et al. | 74/5.34 |
| 3,045,356 | 7/1962 | Uecker | 33/322 |
| 3,075,729 | 1/1963 | Noxon | 33/322 X |
| 3,455,172 | 7/1969 | Burns | 74/5.8 X |

OTHER PUBLICATIONS

Bendix Pub. Two Gyro All-Attitude Control, Pub. #663.23, dated 3/21/66.

*Primary Examiner*—Harry N. Haroian
*Attorney, Agent, or Firm*—Paul F. McCaul; John R. Manning

[57] ABSTRACT

A two-gyro four-gimbal attitude sensing system having gimbal lock avoidance is provided with continuous azimuth information, rather than roll information, relative to the magnetic cardinal headings while in near vertical attitudes, thereby to allow recovery from vertical on a desired heading. The system is comprised of means (48) for stabilizing an outer roll gimbal (14) that is common to a vertical gyro (12) and a directional gyro (10) with respect to the aircraft platform (50) which is being angularly displaced about an axis substantially parallel to the outer roll gyro axis, and means (38) for producing a signal indicative of the magnitude of such displacement (62, 64) as an indication of aircraft heading. Means are provided to cause stabilization of the outer roll gimbal (14) whenever the pitch angle of the aircraft passes through a threshold prior to entering vertical flight and destabilization of the outer roll gimbal (14) upon passing through the threshold when departing vertical flight.

9 Claims, 4 Drawing Figures

AIRCRAFT BODY-AXIS ROTATION MEASUREMENT SYSTEM

ORIGIN OF THE INVENTION

The invention described herein was made by an employee of the United States Government and may be manufactured and used by and for the Government for Government purposes without the payment of any royalties thereon or therefor.

FIELD OF THE INVENTION

This invention relates to gyro systems, particularly to apparatus for indicating the orientation of aircraft in flight, and more particularly to providing continuous azimuth information as the aircraft turns on its roll axis while in near vertical flight, and for preventing tumble of platforms in gyro systems upon departure from near vertical flight.

BACKGROUND OF THE INVENTION

Vertical and directional gyroscopes, hereinafter referred to as gyros, have been used in aircraft to provide signals to stabilize flight and to provide heading and aircraft attitude information. Typically the two gyros are mounted on a common outer gimbal which pivots on the roll axis of the aircraft. U.S. pat. Nos. 2,941,306 and 3,045,356 illustrate two systems that are illustrative of the state of the art. The Bendix Corporation has developed automatic control and attitude reference systems for aircraft, typical of which is an automatic control system disclosed in U.S. Pat. No. 3,075,729. Of particular interest to this invention is a two-gyro platform manufactured by the Bendix Corporation, Part Number 19005-1B. The outer roll gimbal common to both the vertical and the directional gyro is pivoted by a servomechanism on the roll axis in response to signals from the vertical gyro. This aligns the directional gyro to the vertical gyro gimbals and keeps the directional gyro oriented to the vertical at all times. The outer roll gimbal becomes the third degree of freedom of the vertical gyro.

The roll servo input signal is derived from the syncho transmitter on the roll axis of the outer gimbal common to both gyros. The pitch servo input signal is derived from the synchro transmitter on the pitch axis of the vertical gyro in conjunction with a control transformer on the pitch axis of the directional gyro. These signals are supplied to separate servo motor generators mounted on the gyro platform fixed to the aircraft main frame. These motor generators drive their respective gear trains into a directional gear. The input gear in the roll train to the differential also acts as a direct transmission to the gear that is attached to, and drives, the common roll gimbal. The gear trains are designed so that a pure roll input will produce no relative rotation of the common outer roll gimbal, but when a simultaneous pitch input occurs, the combined inputs will then produce a corresponding rotation of the pitch gimbal to maintain the directional gyro oriented orthogonal to the vertical gyro, i.e., to maintain the third gimbal of the directional gyro normal to the second gimbal of the vertical gyro.

For high performance maneuvers, there is an optional "special functions" operation of this two-gyro four-gimbal attitude sensing system which provides for continuous roll axis information when the aircraft nears vertical pitch. At such an attitude, the roll axis becomes essentially identical with the azimuth axis, so without stabilization, the outer roll gimbal could revolve about the axis of the vertical gyro as a result of the familiar "gimbal lock" phenomenon. As a consequence, there is provided means for sensing when the aircraft pitch nears vertical (within 15°), a special azimuth and roll-pitch resolver signal is fed to the roll servomechanism, causing the outer roll gimbal to maintain its position in space relative to the azimuth of the aircraft immediately preceding the maneuver. This prevents "gimbal lock" and allows for continuous roll information during the maneuver. This is because the common outer roll gimbal is now fixed in space, and not fixed to the airframe, thus permitting true roll indication at any point regardless of the near vertical pitch attitude.

The problem with this sytem for avoiding "gimbal lock" is that geographic heading information is unavailable during a near vertical maneuver. Yet such information is vitally important if the aircraft is to pull out of the maneuver at a desired geographic heading. It would be desirable to modify such a two-gyro four-gimbal system to optionally provide heading information continuously throughout a flight profile whereby the aircraft rotates from a level attitude into a vertical flight attitude, and while in vertical flght, spins about its longitudinal axis, and returns to level flight attitude with normal geographic heading accuracy maintained. More specifically, it would be desirable to provide an electronic signal from a two-gyro four-gimbal attitude system platform that functions to define an aircraft body axis rotation around the aircraft longitudinal axis for onboard cockpit display, or for remote ground based control cockpit display of heading for precise geographic profile control.

SUMMARY OF THE INVENTION

In accordance with the present invention, a two-gyro four-gimbal attitude sensing system having gimbal lock avoidance, as described above, is provided with the option for continuous azimuth information rather than roll information for onboard cockpit display, or for remote ground based control cockpit display, relative to the magnetic cardinal headings while in near vertical attitudes, thereby to allow recovery from vertical on a desired heading. The present invention will also substantially lessen the probability of gyro tumble upon departure from a vertical attitude. The system is comprised of means for stabilizing an outer roll gimbal that is common to a vertical gyro and a directional gyro with respect to the aircraft platform which is being angularly displaced about an axis substantially parallel to the outer roll gyro axis and means for producing a signal indicative of the magnitude of such displacement as an indication of aircraft heading. Means are provided for so stabilizing the outer roll gimbal whenever the pitch angle of the aircraft passes through a threshold prior to entering vertical flight and for destabilizing the outer roll gimbal upon passing through the threshold when departing vertical flight.

Since any two of the aircraft or gyro axes define a plane, angular displacement will normally occur between the plane defined by the aircraft longitudinal and lateral axes and the plane defined by the gyro roll and pitch axes whenever the aircraft assumes a rolling attitude. Similarly, such angular displacements will normally occur between the planes defined by the aircraft vertical and lateral axes and the gyro azimuth and pitch axes in a climb or dive and between the aircraft longitudinal and vertical axes and the gyro roll and azimuth in a yaw (change of azimuth) attitude. The present invention provides means for controlling and/or sensing such angular displacements between the aircraft and gyro axes and/or the planes defined thereby.

The novel features that are considered characteristic of this invention are set forth with particularity in the appended claims. The invention will best be understood from the following description when read in connection with the accompanying drawings.

Reference will now be made in detail to a preferred embodiment of the invention, an example of which is illustrated in the accompanying drawings.

DESCRIPTION OF PREFERRED EMBODIMENTS

Figure 1:
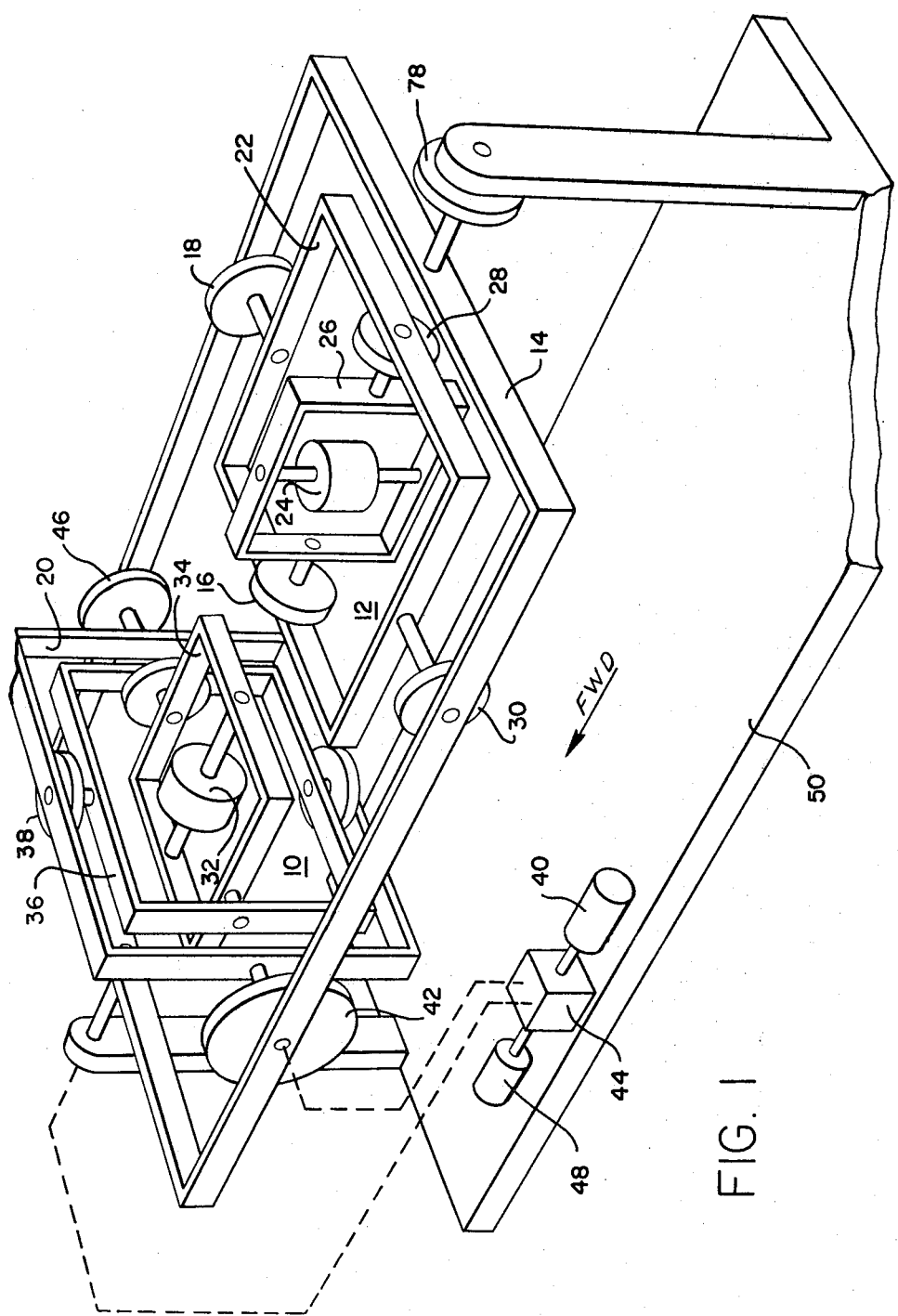
FIG. 1 is a simplified isometric depiction of the gyros employed in the present invention.

A conventional body-axis rotation measurement system is exemplified by the Bendix system (Part No. 19005-1B). It is comprised of separate directional and vertical gyroscopes 10 and 12, hereinafter referred to as gyros, mounted within a common outer roll gimbal 14, as shown in a simplified diagram in FIG. 1. Some elements of the Bendix system shown will be described briefly to provide an understanding of a typical environment for the present invention. Other elements not shown would be necessary for a more technical description of the Bendix system in its conventional modes of operation, but since the present invention modifies the Bendix system to provide a new system with a special mode of operation, only enough of the Bendix system necessary to fully understand the invention will now be described with reference to FIG. 1.

The directional gyro 10 and a vertical gyro 12 are slaved to the gravity vector of the earth through conventional and independent erection means (not shown). Each gyro is independently gimbaled within a common outer roll gimbal 14. The latter is caused to pivot about the roll axis of the system in response to signals from the vertical gyro 12 to maintain the directional gyro component vertical with respect to the earth at all times.

Through utilization of conventional means, a roll servo input signal is derived from a synchro transmitter 16 on the roll axis of the vertical gyro 12. Similarly, a pitch servo input signal is derived from a synchro transmitter 18 on the pitch axis of the vertical gyro in conjunction with a control transformer (also not shown) on the pitch axis of the directional gyro mounting. These roll and pitch signals are brought out of the gimbal system, amplified and supplied to servo motors through gear trains, as noted hereinbefore.

The directional gyro 10 is stabilized by the vertical gyro 12 to a gravity vertical by mechanically coupling a pitch gimbal 20 of the directional gyro 10 to a pitch gimbal 22 of the vertical gyro 12. This mechanical coupling (not shown) enables the two gimbals to be maintained at substantially right angles to each other. The outer roll gimbal 14, on which both gyros are mounted, performs a similar stabilizing function for the roll axis.

The vertical gyro 12 is constructed such that a gyro wheel 24 is mounted in an inner roll gimbal 26 that rotates about an inner-roll axis parallel to the roll axis of the system. This inner roll gimbal 26 is mounted on the second (pitch) gimbal 22 that rotates about the pitch axis. Mounted on the pitch gimbal 22 are a torquer 28 for the inner roll gimbal 26 and the synchro-transmitter 16 to measure the angular displacement of the inner roll gimbal 26 about the inner roll axis, and to provide a signal proportionate thereto. The pitch gimbal 22 is mounted on the common outer roll gimbal 14. Mounted also on the outer roll gimbal 14 are a torquer 30 for the pitch gimbal 22 and the synchro-transmitter 18 to measure the angular displacement between the outer roll gimbal 14 and the pitch gimbal 22 about the pitch axis, and to provide a signal proportionate thereto.

The directional gyro 10 provides a signal that is proportional to heading. The gyro wheel 32 is mounted within an inner gimbal 34 which pivots on an axis that is substantially horizontal with respect to the earth. The inner gimbal 34 is mounted within a second (azimuth) gimbal 36 which rotates about the vertically oriented azimuth axis within the pitch gimbal 20. The azimuth gimbal 36 provides signals which are transmitted by a synchro-transmitter 38 mounted on the third (pitch) gimbal 20. The pitch gimbal 20 is suspended within the outer roll gimbal 14 common to both the directional and the vertical gyros. The pitch gimbal 20 rotates about the pitch axis and is stabilized by a servo motor generator 40 which connects the pitch synchro 42 of the directional gyro 10 to the pitch synchro-transmitter 18 of the vertical gyro 12 through a gear train represented schematically by a block 44.

An additional function of the Bendix system (Part No. 19005-1B) is so called "special functions" operation which provides continuous roll axis information when an aircraft is in near vertical flight while in a climb or dive, as noted hereinbefore. At such an attitude, the outer roll axis becomes substantially identical with the azimuth axis and, with no stabilization, the outer roll gimbal 14 could revolve continuously about the azimuth axis, producing the well known "gimbal lock" phenomenon.

"Special functions" operation prevents such gimbal lock by providing that whenever the system is operated with the roll axis in a region approximately plus or minus 15° from vertical, a special azimuth and roll-pitch resolver 46 signal is fed to an outer roll servo motor generator 48, causing the outer roll gimbal 14 to maintain a position in space approximating the position it occupied immediately prior to the maneuver. Because the outer roll gimbal 14 is stabilized in space rather than in fixed relationship to the aircraft platform 50, true roll indications are available regardless of pitch attitude.

It will be noted that the prior art discussed above is incapable of providing azimuth information when the platform 50 assumes a substantially vertical pitch orientation; that is, in an unstabilized system not employing "special functions" operation, continuous movement of the outer roll gimbal 14 about the vertical axis when the platform is in vertical pitch will cause a continuously changing roll and azimuth signal to be transmitted regardless of and unrelated to the movement of the platform. When "special functions" operation is selected, accurate roll rate information is available as just described, but no azimuth information is available during either unstabilized or "special functions" operation.

The shortcoming of the prior art gyro system in providing no indication of heading changes when in vertical operation, i.e., when the aircraft is in near vertical flight while moving "wing over wing" about the longitudinal axis of the aircraft, results in the pilot or ground controller having no knowledge of what heading the aircraft will assume upon departing vertical flight.

In conventional gyro systems as described hereinabove, it is possible that large error signals will develop as a result of rapid angular displacements between the inner roll gimbal 26 and the pitch gimbal 22 of the vertical gyro 12 during rapid changes in aircraft pitch when departing vertical flight.

An error signal will be generated by the inner roll synchro transmitter 16, if, during "special functions" operation after pitching from a wings level (no roll) attitude into substantially vertical flight and then rotating about its longitudinal axis, the aircraft then pitches out of vertical flight. As the aircraft pitches back to horizontal flight, the mechanical coupling between the platform, the outer roll gimbal 14 and the pitch gimbal 22 will cause the outer roll gimbal 14 and pitch gimbal 22 to follow the platform movement while the inner roll gimbal 26 remains stationary in space. The error signal so generated is coupled to the outer roll gimbal 14 which moves in the appropriate direction to restore orthogonality to the inner roll gimbal 26 and the pitch gimbal 22. If the pitch movement is sufficiently rapid, collision of the gimbals and loss of reference or "tumbling" of the gyro can result.

Operation of the above-described prior art third gimbal system will now be described with reference to a schematic diagram shown in FIG. 2. Such a system is designed for installation in aircraft such that the roll axis of the gyro system is parallel to the longitudinal axis of the aircraft at all times. The azimuth axis of the system is independent of the position of the vertical axis of the aircraft and the pitch axis of the system is independent of the position of the lateral axis of the aircraft. The azimuth and pitch axes may therefore remain stationary in space during aircraft maneuvers.

Figure 2:
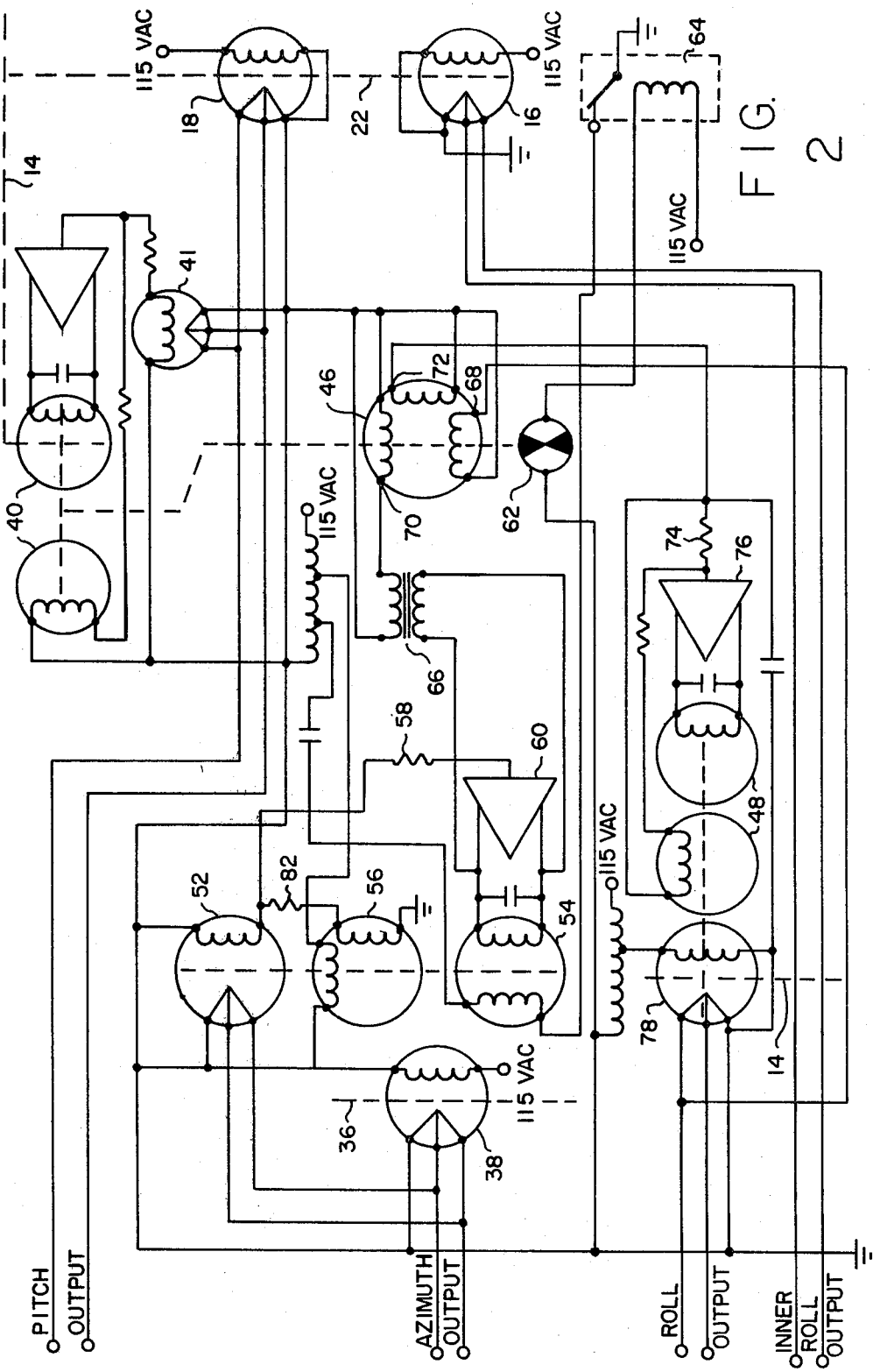
FIG. 2 is a simplified schematic representation of a typical prior art gyro system.

FIG. 2 shows an azimuth synchro transmitter 38 with an output connected to a control transformer 52 which is mounted on a common shaft with a motor 54 and a generator 56. A signal from the output of synchro transmitter 38 will pass through control transformer 52, resistor 58 and amplifier 60 to the input of motor 54. The signal impressed across the input of motor 54 will, in the absence of "special functions" operation, cause the common shaft to turn so long as a signal appears at the output of control transformer 52. The shaft will stop only when in a position to enable control transformer 52 to null out the signal from synchro transmitter 38. Thus, the common shaft of motor 54, generator 56 and control transformer 52 provides an azimuth reference at a given point in time. It should be noted that these elements 52 through 60, and other elements to follow, are not shown in FIG. 1, which merely served to show the organization of the gyros in the outer roll gimbal.

As the pitch of the gyro platform 50 is brought within plus or minus 15° of vertical, a sensing switch 62 which is shaft coupled to the pitch servo motor generator 40 closes, thereby energizing relay 64 and removing the ground from the motor 54 which causes the common shaft of the motor 54 and control transformer 52 to become stationary at the position it has assumed immediately preceding the closure of switch 62. Since the shaft is now stationary, control transformer 52 will pass a continuous azimuth signal through amplifier 60, thence through a transformer 66 and to resolver 46 where a composite pitch-roll signal is added to the azimuth signal at inputs 68 and 70. The composite signal at output terminal 72 of resolver 46 is coupled through resistor 74 and amplifier 76 to the input of the outer roll gimbal servo motor generated 48. This signal is of such magnitude and phase as to cause servo motor generator 48 to maintain the outer roll gimbal stationary in space during the duration of "special functions" operation. Movement of the platform 50 about the outer roll axis will therefore result in transmission of a continuous roll signal from the outer roll synchro-transmitter 78 affixed to the platform regardless of the pitch of the platform.

This "special functions" operation is modified in the present invention to provide the option of continuous geographic heading information as the aircraft enters, maintains and departs from near vertical flight. This modification or option will now be described with reference to FIG. 3 wherein components common to those in FIG. 2 are identified by the reference numerals.

Figure 3:
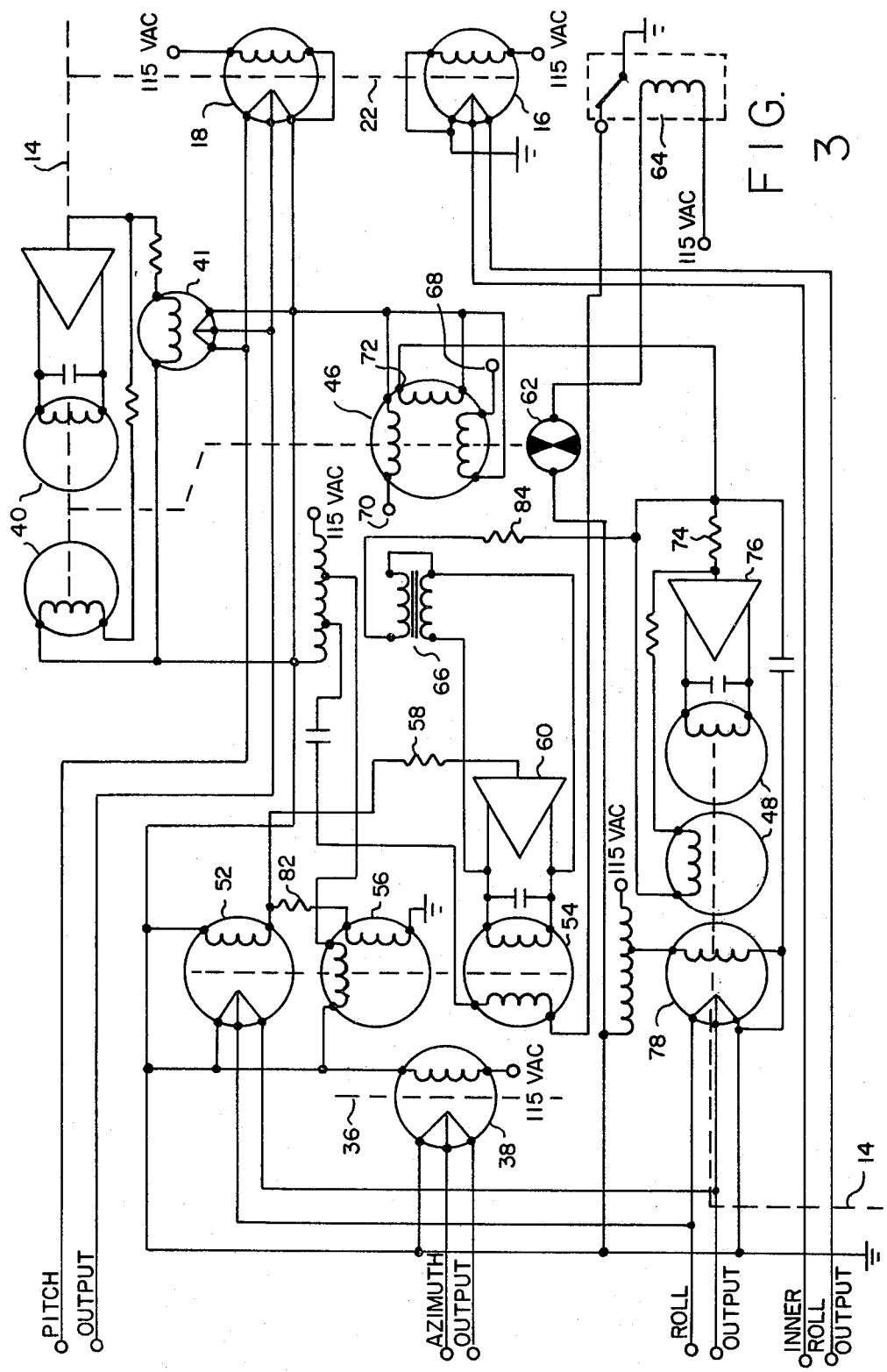
FIG. 3 is a schematic representation of the electrical system of the present invention.

Referring now to FIG. 3, the output of outer roll synchro transmitter 78 is connected to the input of control transformer 52 which has an output coupled through resistor 58 to the input of amplifier 60. The output of this amplifier is connected to the input of motor 54. Motor 54 has a shaft common to generator 56 and to control transformer 52. The input of the generator 56 is connected through resistor 82 to the output of the control transformer 52. The output of amplifier 60 is also connected to the primary winding of transformer 66. The secondary winding of transformer 66 is connected through resistors 84 and 74 to the input of outer roll servo amplifier 76. When the aircraft is oriented at a pitch angle greater than 15° from the vertical, the roll signal from the outer roll synchro 78 is coupled to the input of control transformer 52. This signal appears at the output of control transformer 52 and is coupled through resistor 58 to the input of amplifier 60. The output of amplifier 60 is connected to the input of motor 54. The motor responds to the signal by rotating the shaft common to the generator 56 and control transformer 52 until the shaft of control transformer 52 is positioned so as to null out the signal from the outer roll synchro-transmitter 78 appearing at the input of control transformer 52. Thus, so long as the shaft of motor 54 is allowed to move in response to the signal applied to the input thereof, the signal will be immediately nulled. The nulling of the outer roll signal by the control transformer 52 results in a signal across the primary winding of transformer 66 having a value of substantially zero and causes the system to operate precisely as if the circuitry described hereinabove did not exist, i.e., the system operates as if the output signal of the outer roll synchro transmitter 78 went directly out of the system without being routed to control transformer 52.

When the platform pitch increases to within 15° of vertical, the 15° pitch threshold is sensed by the sector switch 62, comprising a split ring arrangement of conventional design connected to the shaft of pitch servo motor generator 40. Switch 62 closes, thereby activating relay 64 which removes the ground from motor 54. When the ground is removed from motor 54, the shaft common to motor 54 and control transformer 52 freezes in the position it had assumed immediately prior to the closure of switch 62. The shaft position therefore serves as a reference value for roll as the aircraft pitches to within 15° of vertical.

Since the closure of switch 62 prevents motion of the shaft of motor 54, a roll signal appearing at the output of control transformer 52 will drive amplifier 60 and cause a nonzero signal to appear at the primary winding of transformer 66. This signal is coupled to the secondary winding of transformer 66 and through resistors 84 and 74 to the input of servo amplifier 76, thereby causing the shaft of motor generator 48 to rotate the outer roll gimbal 14 sufficiently with respect to the platform 50 to null the output signal from synchro transmitter 78. The effect therefore, is to cause the outer roll gimbal 14 to maintain the same positional relationship with the platform 50 as it had assumed immediately prior to the closing of switch 62. It should be noted that the present invention does not utilize a roll-pitch resolved signal to the outer roll servo amplifier 76. Accordingly, input terminals 68, 70 of resolver 46 are disconnected from their respective signal sources.

Figure 4:
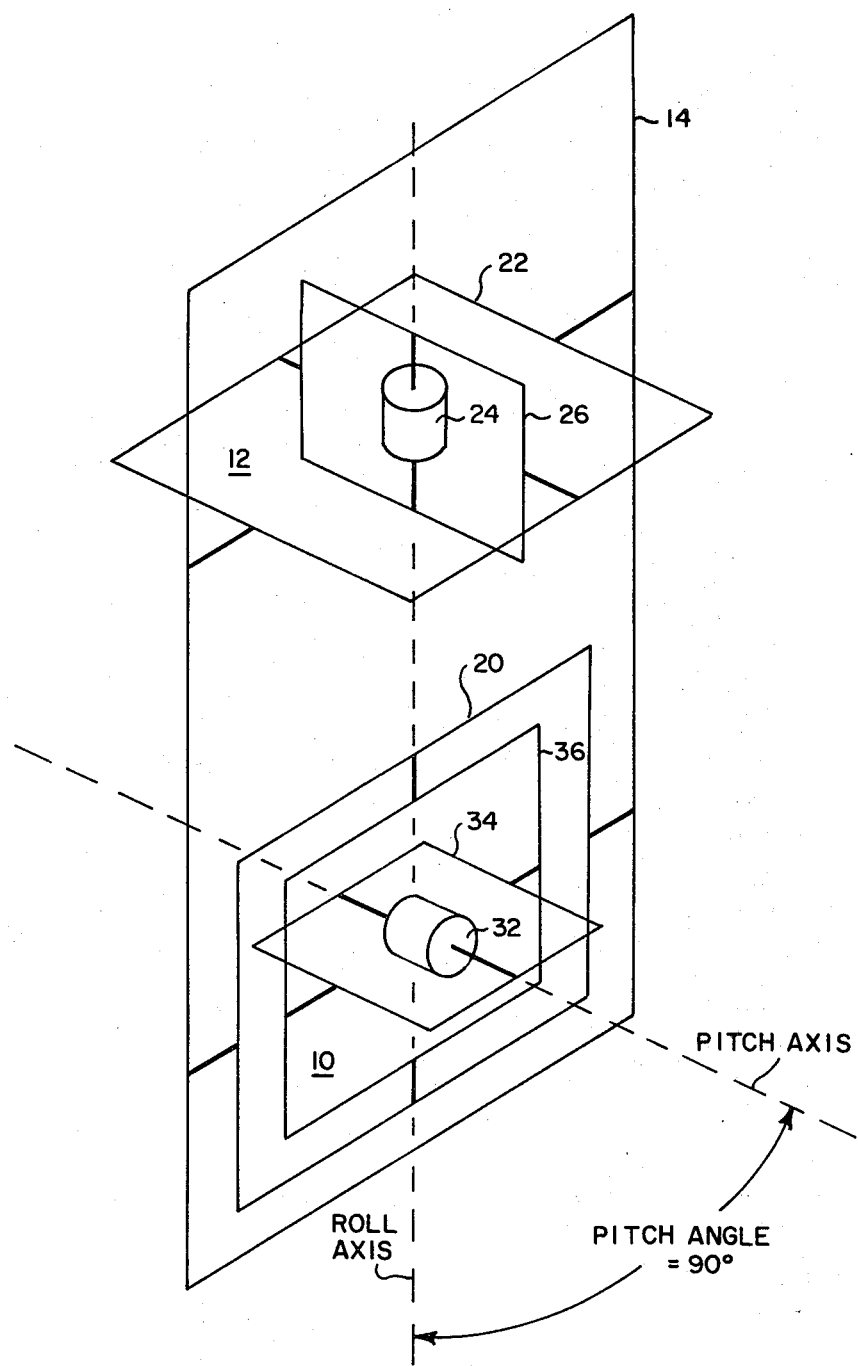
FIG. 4 illustrates the gyros of FIG. 1 during vertical flight (nose down).

Reference is now directed to FIG. 4 which depicts the orientation of the gimbals as the aircraft enters vertical flight (nose down). In vertical flight, both the outer roll gimbal 14 and the pitch gimbal 20 of the directional gyro 10 rotate about a substantially vertical axis since the outer roll gimbal 14 and pitch gimbal 20 are connected such that movement of the outer roll gimbal 14 about its axis forces a corresponding movement of the pitch gimbal 20 about the azimuth axis. Movement of the outer roll gimbal 14 while the platform 50 is in a substantially vertical pitch orientation, will cause the pitch gimbal to move relative to the spatially stationary azimuth gimbal 36, causing an error signal to appear at the output of the azimuth synchro-transmitter 38 which takes the form of an azimuth signal change. The azimuth signal is read out of the system in exactly the same manner as if the platform 50 were at a pitch angle of less than 15° from the vertical. It should be noted that while in near vertical flight the longitudinal axis of the aircraft lies in a near vertical plane, and the vertical axis of the aircraft lies in a near horizontal plane. Therefore this signal is proportional to rotation of the vertical axis of the aircraft about the longitudinal axis whereas in horizontal flight the signal would be proportional to rotation of the longitudinal axis about the vertical axis. Consequently, this signal provides an indication of the aircraft geographical heading to permit the aircraft to be controlled for departure from vertical flight on any desired geographic heading.

In the present invention, the outer roll gimbal 14 is maintained stationary with respect to the aircraft platform as the aircraft moves about its longitudinal axis while in near vertical flight. In other words, when the aircraft rotates about its longitudinal axis during near vertical flight, the outer roll gimbal 14 "follows" such movement by rotating about its axis as though locked onto the platform 50. This necessary condition established in order to provide geographical heading information during near vertical flight is essential to a second feature of the invention, which is to reduce the probability of the gyro "tumbling" when departing vertical flight.

Because the outer roll gimbal 14 is maintained in a stationary relationship with the aircraft platform throughout a vertical flight maneuver, the outer roll gimbal 14, the pitch gimbal 22 and the inner roll gimbal 26 of the vertical gyro 12 remain substantially orthogonal. As a result, when the aircraft platform pitches from vertical toward horizontal flight, the outer roll gimbal 14 is free to follow the aircraft platform without disturbing the spatial orientation of the pitch gimbal 22, and the inner roll gimbal 26 of the vertical gyro 12. Similarly, no movement of the inner gimbals of the directional gyro 10 is induced during departure from vertical flight. Because movement between the inner gimbals is not induced when departing vertical flight, the probability of gyro tumble during such maneuvers is greatly reduced.

It should be noted that the effectiveness of the aforementioned "antitumble" provision decreases in proportion to the roll angle of the aircraft as it pitches to within 15° of vertical. In the unlikely event that the aircraft entered to within plus or minus 15° of vertical at a 90° roll angle, the antitumble capability of the system upon departing vertical flight would be only equivalent to that of a conventional system, but as the roll angle decreases from 90° and approaches wings level upon passing to within plus or minus 15° of vertical, the antitumble capability of the system is significantly enhanced by the present invention.

In accordance with the description provided above, one should now appreciate that a novel system has been disclosed for providing azimuth information to the pilot or ground controller regardless of the pitch orientation of the aircraft and for providing an enhanced capability to maneuver the aircraft while preventing gyro "tumble" or loss of reference. Although the invention has been described in terms of one preferred embodiment it is recognized that other embodiments of the invention may be immediately apparent to those skilled in the art. The claims of this invention are intended to encompass all such embodiments.

What is claimed is:

1. A displacement gyroscope system for indicating the orientation of a body in space, said body having orthogonal longitudinal, lateral and vertical axes, comprising:

an outer roll gimbal mounted to said body for rotation about an outer roll axis substantially parallel to said longitudinal axis;

first means for providing an indication that the magnitude of the first angular displacement of the longitudinal axis from the horizontal earth plane is equal to or greater than a threshold value;

second means, responsive to said first means, for maintaining said outer roll gimbal substantially stationary with respect to a first plane defined by said longitudinal and said lateral axes; and third means for providing a first signal indicative of the angular displacement of said longitudinal axis about said vertical axis when the magnitude of said first angular displacement is less than said threshold value and indicative of the angular displacement of said vertical axis about said longitudinal axis when the magnitude of said first angular displacement is equal to or greater than said threshold value.

2. The system of claim 1 including an outer roll synchro-transmitter connected to said outer roll gimbal for providing a signal responsive to movement of said outer roll gimbal with respect to said body about said outer roll axis and an outer roll servo having an input and an output connected to said outer roll gimbal for moving said outer roll gimbal, and wherein said second means includes said outer roll synchro transmitter and said outer roll servo; and a control transformer having an input and an output and a shaft for rotation therewithin;

a motor having an input and a shaft common with said control transformer;

means for coupling said output of said outer roll synchro-transmitter to said input of said control transformer;

means for coupling said output of said control transformer to said input of said motor;

means for disabling said motor when said longitudinal axis angular displacement from the horizontal earth plane exceeds a threshold value; and means for coupling said output of said control transformer to the input of said outer roll servo when said motor is disabled.

3. The system of claim 2 wherein said means for coupling said output of said control transformer to said input of said motor comprises an amplifier in series with a resistance.

4. The system of claim 2 wherein said means for disabling said motor comprises a sensing switch for sensing a pitch threshold and a relay connected to said switch and to said motor.

5. The system of claim 2 wherein said means for coupling said output of said control transformer to said input of said outer roll servo comprises a resistance in series with an amplifier and the primary winding of a transformer having a secondary winding connected to the input of said servo through a resistance and an amplifier.

6. An aircraft indicating system, comprising:

first means for producing a first signal indicative of the magnitude of a first angular displacement of the longitudinal axis of said aircraft from the horizontal earth plane;

second means for producing a second signal indicative of the magnitude of a second angular displacement of a first plane defined by the longitudinal and the vertical axis of the aircraft from a second plane containing the longitudinal axis of said aircraft;

third means for detecting a threshold value of said first signal;

fourth means, responsive to said third means, for establishing as a reference the value of said second signal corresponding to said threshold value of said first signal; and fifth means responsive to said third means, for providing a signal indicative of the angular displacement of said aircraft about the longitudinal axis thereof with respect to said reference.

7. In a gyroscope system attached to a platform having orthogonal longitudinal, vertical and lateral axes, and said gyroscope system having directional and vertical gyros mounted within a common gimbal which is mounted upon an axis parallel to said longitudinal axis, the improvement comprising means for providing a signal indicative of the angular displacement of the vertical axis of said platform from a reference plane which includes the longitudinal axis of said platform when said longitudinal axis is oriented substantially perpendicular to the surface of the earth, said means including switch means for providing an indication of said longitudinal axis reaching a threshold value of angular displacement with respect to the horizontal plane of the earth, and feedback signal means responsive to said switch means to stabilize said common gimbal with respect to said platform.

8. A displacement gyroscope system having orthogonal roll, pitch and azimuth axes for indicating the orientation of a body in space, said body having orthogonal longitudinal, lateral and vertical axes wherein said roll axis is maintained substantially parallel to said longitudinal axis, comprising:

a gimbal mounted for rotation about said outer roll axis;

first means for producing a first signal indicative of the angular displacement of said longitudinal axis from a first reference plane parallel to the horizontal earth plane;

second means responsive to said first signal for detecting a threshold value thereof;

third means for producing a second signal indicative of the angular relationship between a second plane defined by said roll and pitch axes and a third plane defined by said longitudinal and lateral axes;

fourth means for establishing the value of said second signal corresponding to said threshold value of said first signal; and fifth means for maintaining the angular relationship between said second and said third planes substantially equivalent to the angular relationship therebetween corresponding to said threshold value of said first signal for any amount of rotation of said body about said longitudinal axis.

9. The gyroscope system of claim 8, further including means for producing a third signal indicative of the angular displacement of said vertical axis about said longitudinal axis when said angular displacement of said longitudinal axis exceeds said threshold value.

* * * * *